United States Patent
Lee et al.

(10) Patent No.: US 9,127,667 B2
(45) Date of Patent: Sep. 8, 2015

(54) DEVICE FOR CONTROLLING FAIL-SAFE OF HYBRID VEHICLE AND METHOD THEREOF

(71) Applicants: Hyundai Motor Company, Seoul (KR); Kia Motors Corporation, Seoul (KR)

(72) Inventors: Jang Mi Lee, Tongyeong-si (KR); SangLok Song, Hwaseong-si (KR); Haksung Lee, Gunpo-si (KR); Gyeongcheol Kim, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 99 days.

(21) Appl. No.: 14/095,464

(22) Filed: Dec. 3, 2013

(65) Prior Publication Data
US 2014/0371960 A1  Dec. 18, 2014

(30) Foreign Application Priority Data
Jun. 12, 2013  (KR) .......... 10-2013-0067342

(51) Int. Cl.
*B60L 9/00* (2006.01)
*B60L 11/00* (2006.01)
*F04B 49/06* (2006.01)
*B60W 20/00* (2006.01)
*F04B 17/03* (2006.01)
*F04B 49/08* (2006.01)
*F16D 48/02* (2006.01)
*F16H 61/00* (2006.01)

(52) U.S. Cl.
CPC .............. *F04B 49/065* (2013.01); *B60W 20/50* (2013.01); *F04B 17/03* (2013.01); *F04B 49/08* (2013.01); *F16D 25/14* (2013.01); *F16H 61/0028* (2013.01); *F16H 2061/005* (2013.01); *F16H 2061/0075* (2013.01); *Y10S 903/903* (2013.01)

(58) Field of Classification Search
CPC ........ F04B 49/065; F04B 17/03; F04B 49/08; B60Q 20/50; F16D 25/14; F16H 61/0028; F16H 2061/005; F16H 2061/0075; Y10S 903/903
See application file for complete search history.

(56) References Cited

U.S. PATENT DOCUMENTS

2013/0124022 A1*  5/2013  Persson et al. ................. 701/22

FOREIGN PATENT DOCUMENTS

| KR | 1020080014395 A | 2/2008 |
| KR | 1020080087487 A | 10/2008 |
| KR | 1020110035693 A | 4/2011 |

* cited by examiner

*Primary Examiner* — Mary Cheung
(74) *Attorney, Agent, or Firm* — Morgan, Lewis & Bockius LLP

(57) ABSTRACT

A device for controlling fail-safe of a hybrid vehicle capable of providing fail-safe running by controlling drive of an electric oil pump with a generation voltage of a hybrid starter and generator (HSG) or a drive motor when a main relay may be cutoff due to failure of a high voltage component may include a method having determining whether the hybrid vehicle proceeds to a fail-safe mode due to a main relay opened by failure of a high voltage component during running of the hybrid vehicle or not, detecting a generation voltage of an HSG or a drive motor when the proceeding to the fail-safe mode may be determined, and generating oil pressure by controlling driving of an electric oil pump according to a generation amount of the HSG or the drive motor in running in the fail-safe mode or in a stop state.

20 Claims, 3 Drawing Sheets

DEVICE FOR CONTROLLING FAIL-SAFE OF HYBRID VEHICLE AND METHOD THEREOF

CROSS-REFERENCE TO RELATED APPLICATION

The present application claims priority to Korean Patent Application No. 10-2013-0067342 filed on Jun. 12, 2013, the entire contents of which is incorporated herein for all purposes by this reference.

BACKGROUND OF THE INVENTION

1. Field of the Invention

The present invention relates to a device for controlling fail-safe of a hybrid vehicle and a method thereof. More particularly, the present invention relates to a device for controlling fail-safe of a hybrid vehicle, in which drive of an electric oil pump (EOP) is controlled with a voltage generated by a hybrid starter and generator (HSG) or a drive motor when a main relay is cut-off due to failure of a high voltage component, for providing fail-safe running of the hybrid vehicle, and a method thereof.

2. Description of Related Art

Although the hybrid vehicle may be different from a fuel cell vehicle and an electric vehicle in a narrow sense, in the specification, the hybrid vehicle is defined as a vehicle provided with one or more than one battery for using energy stored therein as driving power of the vehicle, including a general electric vehicle and a fuel cell vehicle.

The hybrid vehicle has an engine and a motor applied thereto as power sources, for displaying characteristics of the engine and the motor depending on a running situation to improve fuel consumption and reduce exhaust gas.

In general, the hybrid vehicle has an automatic transmission mounted thereto, and an mechanical oil pump (MOP), connected to and driven by a drive shaft of the engine, supplies oil to a low pressure part requiring lubrication and a high pressure part operating coupled elements in the automatic transmission.

Further, if operation of the engine stops, the mechanical oil pump also stops, to fail supply of the oil to the low pressure part and the high pressure part in an automatic transmission, causing decoupling of a friction element (clutch and brake) which maintains a first forward speed from a planetary gear.

In order to solve the foregoing problem, an electric oil pump driven by a voltage of a battery is mounted parallel with the mechanical oil pump additionally, for driving the electric oil pump (EOP) separate from the engine in the hybrid vehicle.

However, the mechanical oil pump has a disadvantage in that the mechanical oil pump, connected to the engine drive shaft, is normally driven when the engine maintains a start on state to cause a power loss thereby resulting in poor fuel consumption.

Accordingly, structures for omitting the mechanical oil pump from the hybrid vehicle and supplying the oil to the automatic transmission by a single drive of the electric oil pump have been developing.

Since the electric oil pump is driven by the voltage from the battery, if the main relay that connects/disconnects output of the battery voltage is opened due to failure of the high voltage component, the operation of the electric oil pump and the oil pump controller stops due to power supply cutoff.

Accordingly, since the oil cannot be supplied to the automatic transmission, shut down takes place in which the vehicle can run no longer.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a device for controlling fail-safe of a hybrid vehicle having advantages of providing fail-safe running by controlling a drive of an electric oil pump according to a generation voltage of an HSG or a drive motor when a main relay is cutoff by failure of the high voltage component in a hybrid vehicle, and a method thereof.

Various aspects of the present invention are directed to providing a device for controlling fail-safe of a hybrid vehicle and a method thereof having advantages of controlling a drive of an electric oil pump by classifying the control into transmission pressure control, running pressure control, launch pressure control, and stop pressure control according to a generation amount of an HSG or a drive motor when a main relay is cutoff due to failure of a high voltage component in a hybrid vehicle; and a method thereof.

In an aspect of the present invention, a device for controlling fail-safe of a hybrid vehicle including an engine and a drive motor as driving sources, may include a hybrid starter and generator (HSG) engaged to the engine and operating as a motor to perform start on/off of the engine, and operating as a generator in a start on state of the engine, an electric oil pump to supply oil to a transmission and an engine clutch, an operation information detector to detect operating information on the hybrid vehicle, a hybrid controller to control operation of the vehicle based on the general operation information received from the operation information detector, and to control running of the hybrid vehicle in a fail-safe mode when a main relay is opened due to failure of a high voltage component, and an oil pump controller to drive the electric oil pump for supplying oil pressure proper to an operation condition to the transmission and the engine clutch, wherein the oil pump controller is electrically connected to the hybrid controller, wherein the oil pump controller controls a drive of the electric oil pump stage by stage with an generation amount of the HSG or the driver motor to generate the oil pressure when the oil pump controller recognizes that the hybrid controller proceeds to the fail-safe mode due to the failure of the high voltage component.

The oil pump controller controls the electric oil pump to generate control pressure classified into generation of transmission control pressure, generation of launch control pressure, generation of running control pressure, and generation of stop control pressure according to the generation amount of the HSG or the drive motor.

The oil pump controller classifies generation of control pressure stage by stage based on power consumption of the electric oil pump.

When generation of a transmission control pressure is possible with the generation amount of the HSG or the drive motor in the running of the fail-safe mode, the oil pump controller controls the drive of the electric oil pump according to an up/down transmission request for the electric oil pump to generate the transmission control pressure.

When coupling to a target transmission stage is completed in the generation of the transmission control pressure by driving the electric oil pump with the generation amount of the HSG or the drive motor in the running of the fail-safe mode, the oil pump controller controls the drive of the electric oil pump at generation of a running control pressure.

When generation of transmission control pressure is impossible, but the generation of transmission control pressure is possible in the running in the fail-safe mode with the generation amount of the HSG or the drive motor, the oil pump controller drives the electric oil pump with the generation amount for the electric oil pump to generate a running control pressure.

When the generation of running control pressure is impossible with the generation amount of the HSG or the drive motor in the running of the fail-safe mode, the oil pump controller determines that the vehicle is in shut-down, and stops the drive of the electric oil pump.

When generation of a launch control pressure is possible with the generation amount of the HSG or the drive motor in stop in the fail-safe mode, and a launch request is detected, the oil pump controller drives the electric oil pump with the generation amount for the electric oil pump to generate the launch control pressure.

When generation of a launch control pressure is possible with the generation amount of the HSG or the drive motor in stop in the fail-safe mode, and the launch request is not detected, the oil pump controller drives the electric oil pump with the generation amount for the electric oil pump to generate a stop control pressure.

When the generation of launch control pressure is impossible with the generation amount of the HSG or the drive motor in stop in the fail-safe mode, and the launch request is detected, the oil pump controller determines that the vehicle is in shut down and stops the drive of the oil pump.

When the generation of transmission control pressure is possible with the generation amount of the HSG or the drive motor in running in the fail-safe mode, the oil pump controller drives the electric oil pump according to an operation condition for the electric oil pump to generate a transmission control pressure, a launch control pressure, a running control pressure, and a stop control pressure.

In another aspect of the present invention, a method of controlling fail-safe of a hybrid vehicle, may include determining whether the hybrid vehicle proceeds to a fail-safe mode due to a main relay opened by failure of a high voltage component during running of the hybrid vehicle or not, detecting a generation voltage of a hybrid starter and generator (HSG) or a drive motor when the proceeding to the fail-safe mode is determined, and generating oil pressure by controlling drive of an electric oil pump according to a generation amount of the HSG or the drive motor in running in the fail-safe mode or in a stop state.

The method may further include controlling the drive of the electric oil pump to generate control pressure classified into generation of transmission control pressure, generation of launch control pressure, generation of running control pressure, and generation of stop control pressure stage by stage based on power consumption of the electric oil pump according to the generation amount of the HSG or the drive motor.

The method may further include controlling the drive of the electric oil pump at a transmission control pressure according to an up/down transmission request determined by a vehicle speed, and a position of an acceleration pedal when generation of the transmission control pressure is possible with the generation amount of the HSG or the drive motor in the running in the fail-safe mode.

The method may further include controlling the drive of the electric oil pump at the generation of running control pressure when coupling of a target transmission stage is completed in a step of the generation of transmission control pressure with the generation amount of the HSG or the drive motor in the running in the fail-safe mode.

The method may further include controlling the drive of the electric oil pump at the generation of running control pressure when the up/down transmission request is not detected, which is determined by the vehicle speed and the position of the acceleration pedal, though the generation of the transmission control pressure is possible with the generation amount of the HSG or the drive motor in running in the fail-safe mode.

The method may further include controlling the drive of the electric oil pump at generation of running control pressure when the generation of transmission control pressure is impossible, but the generation of the running control pressure is possible with the generation amount of the HSG or the drive motor in the running in the fail-safe mode.

The method may further include controlling the drive of the electric oil pump at generation of launch control pressure when the generation of the launch control pressure is possible with the generation amount of the HSG or the drive motor in stop in the fail-safe mode, and an launch request is detected from tip in to an acceleration pedal and step off from a brake pedal.

The method may further include controlling the drive of the electric oil pump at generation of stop control pressure when generation of launch control pressure is possible with the generation amount of the HSG or the drive motor, and the launch request is not detected in stop in the fail-safe mode.

The method may further include stopping drive of the electric oil pump upon determining that the vehicle is in shut down when the generation of running control pressure is impossible with generation amount of the HSG or the drive motor in running in the fail-safe mode or generation of launch control pressure is impossible with the generation amount of the HSG or the drive motor in stop in the fail safe mode.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
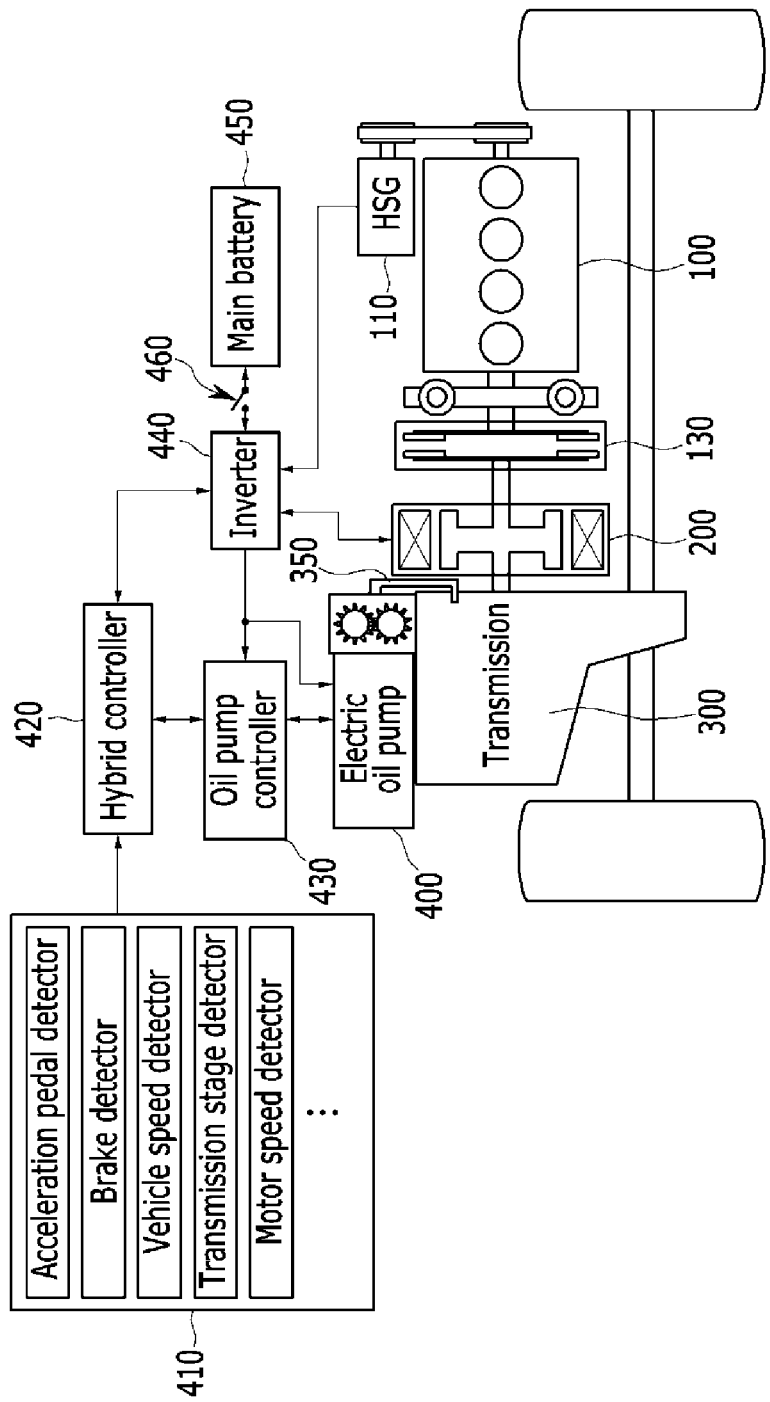
FIG. 1 is a block diagram schematically illustrating a device for controlling fail-safe of a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, the present invention will be described more fully with reference to the accompanying drawings, in which exemplary embodiments of the invention are shown such that persons skilled in this field of art can carry out, easily.

The present invention is not limited to the exemplary embodiments described herein and may be embodied in other modes.

For the purpose of clear description of an exemplary embodiment of the present invention, parts which are not related to the description are omitted. The same reference numbers are used throughout the specification to refer to the same or like parts.

Further, each configuration shown in the drawings are illustrated for better understanding and ease of description at discretion of the designer, and the present invention is not limited to the drawings shown, necessarily.

FIG. 1 is a block diagram schematically illustrating a device for controlling fail-safe of a vehicle according to an exemplary embodiment of the present invention.

Referring to FIG. 1, the device for controlling fail-safe of a vehicle according to an exemplary embodiment of the present invention includes an engine 100, an HSG 110, an engine clutch 130, a drive motor 200, a transmission 300, an electric oil pump 400, an operation information detector 410, a hybrid controller 420, an oil pump controller 430, an inverter 440, a main battery 450, and a main relay 460.

The engine 100 is operative as a first driving source in the hybrid vehicle, and starting on/off is controlled according to an operation mode and an operation situation.

The engine 100 starts off in an EV mode, and starts on in an HEV mode, and the start on/off of the engine 100 are controlled by putting a Hybrid Starter Generator (HSG) function into operation.

The HSG 110 is a motor and a generator, wherein the HSG 110 is operated as a motor upon putting an HSG function into operation to make starting on/off of the engine 100, and, if surplus power is generated in a state the engine 100 maintains staring on, the HSG 110 is operated as the generator to generate a voltage which is charged to the main battery 450 through the inverter 440.

The engine clutch 130 is mounted between the engine 100 and the motor 200 to connect/disconnect power transmission between the engine 100 and the motor 200.

In general, a dry clutch is applied as the engine clutch 130 and is operated by the oil supplied from the electric oil pump 400.

The drive motor 200 is operated as a second driving source in the hybrid vehicle, and is driven by a 3 phase AC current supplied thereto from the inverter 440 to transmit an output torque to the transmission 300, recovers regenerative energy to generate a voltage during deceleration, and charges the voltage generated thus to the main battery 450 through the inverter 440.

An automatic transmission or a continuously variable transmission (CVT) may be applied as the transmission 300, has a speed ratio controlled according to a torque required for operation and an operation situation, and enables the hybrid vehicle to run by forwarding an output torque being summed and applied to driving wheels through the engine clutch 130 at the speed ratio controlled thus.

The electric oil pump 400 supplies the oil to the transmission 300 and engine clutch 130.

The operation information detector 410 detects general operation information including a position of tip in/tip out of an accelerator pedal, on/off of, and pedal force on, a brake pedal, running vehicle speed, and speeds of a transmission stage and the drive motor 200 in running of the hybrid vehicle, and provides the information to the hybrid controller 420.

The hybrid controller 420 is an uppermost controller, and controls general operation with reference to the operation information detected by the operation information detector 410, and proceeds to a fail-safe mode to control running of the hybrid vehicle if the main relay is opened due to failure of a high voltage component.

The oil pump controller 430 drives the electric oil pump 400 to supply the oil proper to a driving condition to the transmission 300 so that Up/Down transmission, launch, running and stop maintenance can be provided.

If the proceeding of the hybrid controller 420 to the fail-safe mode is recognized due to the main relay 460 opened by failure of a high voltage component, the oil pump controller 430 controls a drive of the electric oil pump 400 at control pressure classified into generation of transmission control pressure, generation of launch control pressure, generation of running control pressure, and generation of stop control pressure according to a generation amount of the HSG 110 or the drive motor 200.

The oil pump controller 430 repeatedly learns the drive of the electric oil pump 400 according to the generation amount of the HSG 110 or the drive motor 200 to classify the generation of transmission control pressure, the generation of launch control pressure, the generation of running control pressure, and the generation of stop control pressure.

The control classification is set based on power consumption of the electric oil pump 400, ① generation of transmission control pressure ② a generation of launch control pressure ③ generation of running control pressure ④ generation of stop control pressure in an order of large power consumption.

Further, the oil pump controller 430 analyzes the information provided from the operation information detector 410 to determine whether the vehicle is currently running or stop, and the generation amount of the HSG 110 or the drive motor 200, to determine drive control of the electric oil pump 400.

If the hybrid vehicle is currently running in the fail-safe mode and the generation of transmission control pressure is possible according to the generation amount of the HSG 110 or the drive motor 200, the oil pump controller 430 detects vehicle speed and a position of an accelerator pedal to determine whether an up/down transmission request is detected.

If the hybrid vehicle is currently running in the fail-safe mode and the vehicle speed and a condition of the accelerator pedal are detected as the up/down transmission request in a state a transmission control pressure is possible with the generation amount of the HSG 110 or the drive motor 200, the oil pump controller 430 drives the electric oil pump 400 to generate the transmission control pressure for supplying the oil to the transmission 300 to enable coupling to a target transmission stage.

The oil pump controller 430 controls the drive of the electric oil pump 400 at the generation of transmission control pressure until gear-shifting of the transmission 300 to the target transmission stage is finished. If the gear shifting to the target transmission stage is finished, the oil pump controller 430 controls the drive of the electric oil pump 400 at the generation of running control pressure.

For example, the generation of transmission control pressure may be set under a condition in which the electric oil pump 400 is driven at a first reference speed to generate a first reference pressure and a first reference torque.

Since all of the generation of launch control pressure, the generation of running control pressure, and the generation of stop control pressure are possible in a state the generation of transmission control pressure is possible with the generation amount of the HSG 110 or the drive motor 200, the oil pump controller 430 can control the electric oil pump 400 according to operation situation to supply pressure required by the transmission 300.

Further, if the generation of transmission control pressure is impossible with the generation amount of the HSG 110 or the drive motor 200, the oil pump controller 430 determines whether the generation of running control pressure is possible or not. If the generation of the running control pressure is possible, the oil pump controller 430 controls the oil pump 400 at the generation of running control pressure to maintain current fail-safe running.

However, if the generation of running control pressure is impossible with the generation amount of the HSG 110 or the drive motor 200, the oil pump controller 430, determining that the vehicle is in shut down, stops the drive of the electric oil pump 400.

If the hybrid vehicle stops in the fail-safe mode and the generation of the generation control pressure is possible with the generation amount of the HSG 110 or the drive motor 200, the oil pump controller 430 detects a position of the accelerator pedal and an operation of the brake pedal to detect a launch request.

If the launch request is detected from the position of the accelerator pedal and the operation of the brake pedal, the oil pump controller 430 drives the electric oil pump 400 to generate the launch control pressure so that the oil is supplied to the transmission 300 to launch the vehicle.

If the launch request is not detected, the oil pump controller 430 drives the electric oil pump 400 to generate the stop control pressure so that a stop state maintains.

If the generation of launch control pressure is impossible with the generation amount of the HSG 110 or the drive motor 200, the oil pump controller 430, determining that the vehicle is in the shut down, stops the drive of the oil pump 400.

In above case, for an example, the oil pump controller 430 may control a drive speed of the electric oil pump 400 at the first reference speed, discharge pressure at the first reference pressure, and a torque at the first reference torque to generate the transmission control pressure.

Further, for example, the oil pump controller 430 may control the drive speed of the electric oil pump 400 at the second reference speed, the discharge pressure at the second reference pressure, and the torque at the second reference torque to generate the running control pressure.

Further, for example, the oil pump controller 430 may control the drive speed of the electric oil pump 400 at a third reference speed, the discharge pressure at a third reference pressure, and the torque at a third reference torque to generate the launch control pressure.

Further, for example, the oil pump controller 430 may control the drive speed of the oil pump 400 at a fourth reference speed, the discharge pressure at a fourth reference pressure, and the torque at a fourth reference torque to generate the stop control pressure.

The reference speed, the reference pressure, and the reference torque are, not limited values, but values variable with types of the vehicles and program designs.

The inverter 440 converts a DC voltage from the main battery 450 into a 3 phase AC voltage according to a control signal from the hybrid controller 420 to control torque and speed of the drive motor 200.

When the drive motor 200 is operated as a generator, the inverter 440 supplies a voltage restored as a regenerative energy to the main battery 450 to charge the voltage to the main battery 450.

The inverter 440 pulls down a DC voltage supplied from the main battery 450 in a normal operation mode to supply a driving voltage to the oil pump controller 430 and the electric oil pump 400.

The main battery 450 supplies power to the drive motor 200 to supplement an output of the engine 100 in an HEV mode, and charges the generation voltage of the drive motor 200 thereto.

The main relay 460 connects/disconnects an output of the main battery 450 and is opened under the control of the hybrid controller 420 if the high voltage component fails, to prevent a high voltage from leaking.

Since general operation of the hybrid vehicle according to an exemplary embodiment of the present invention having functions as mentioned above is the same or similar to a general hybrid vehicle, detailed description thereof will be omitted.

The device for controlling fail-safe of a hybrid vehicle and the method thereof of the present invention are related to a technology in which, if the main relay is opened in the hybrid vehicle, the electric oil pump is driven with the generation amount of the HSG or the drive motor to maintain running in the fail-safe mode, only which will be described in detail.

Figure 2A:
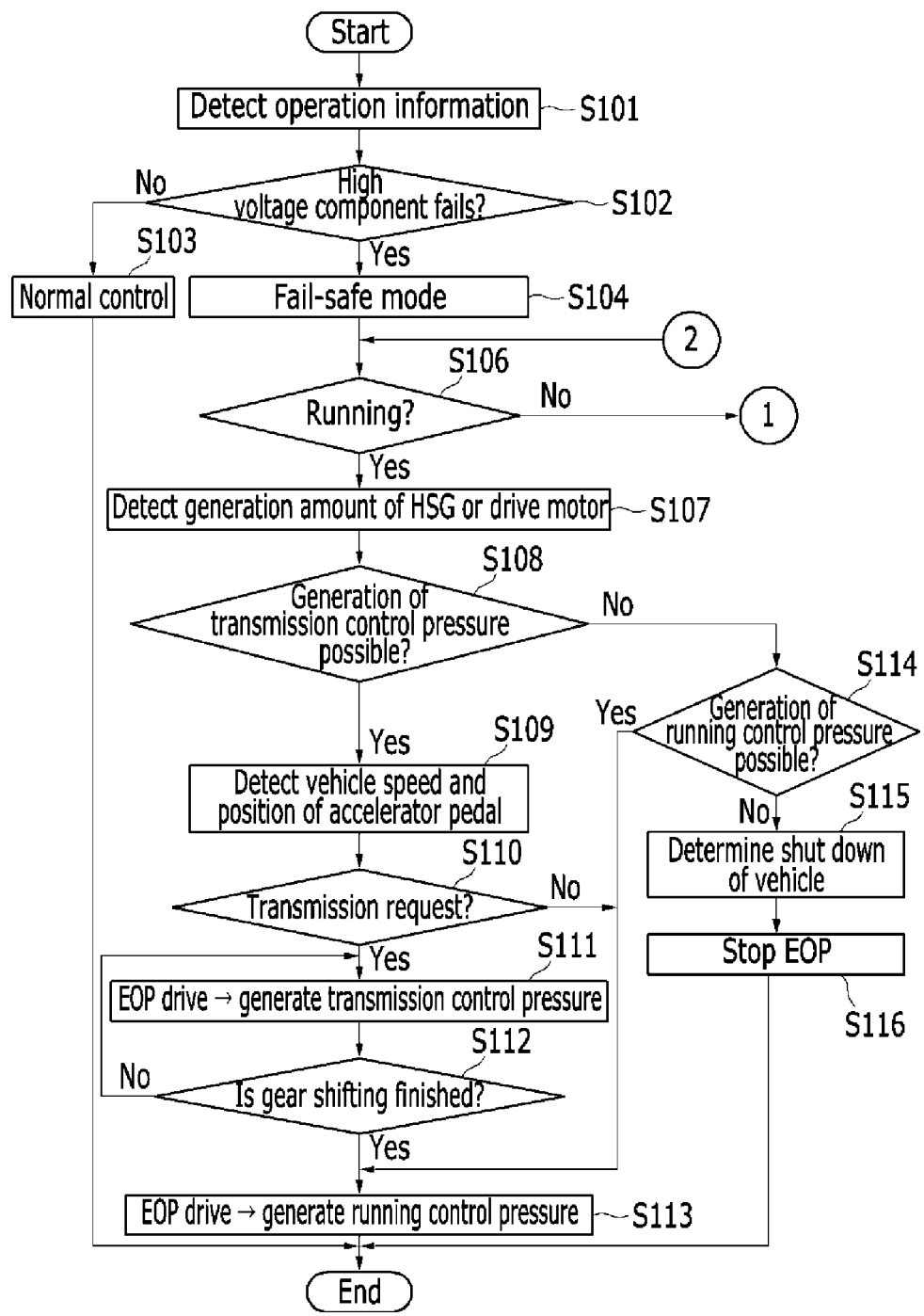
FIGS. 2A and 2B are a flowchart illustrating the steps of a method for controlling fail-safe of a hybrid vehicle according to an exemplary embodiment of the present invention.
Figure 2B:
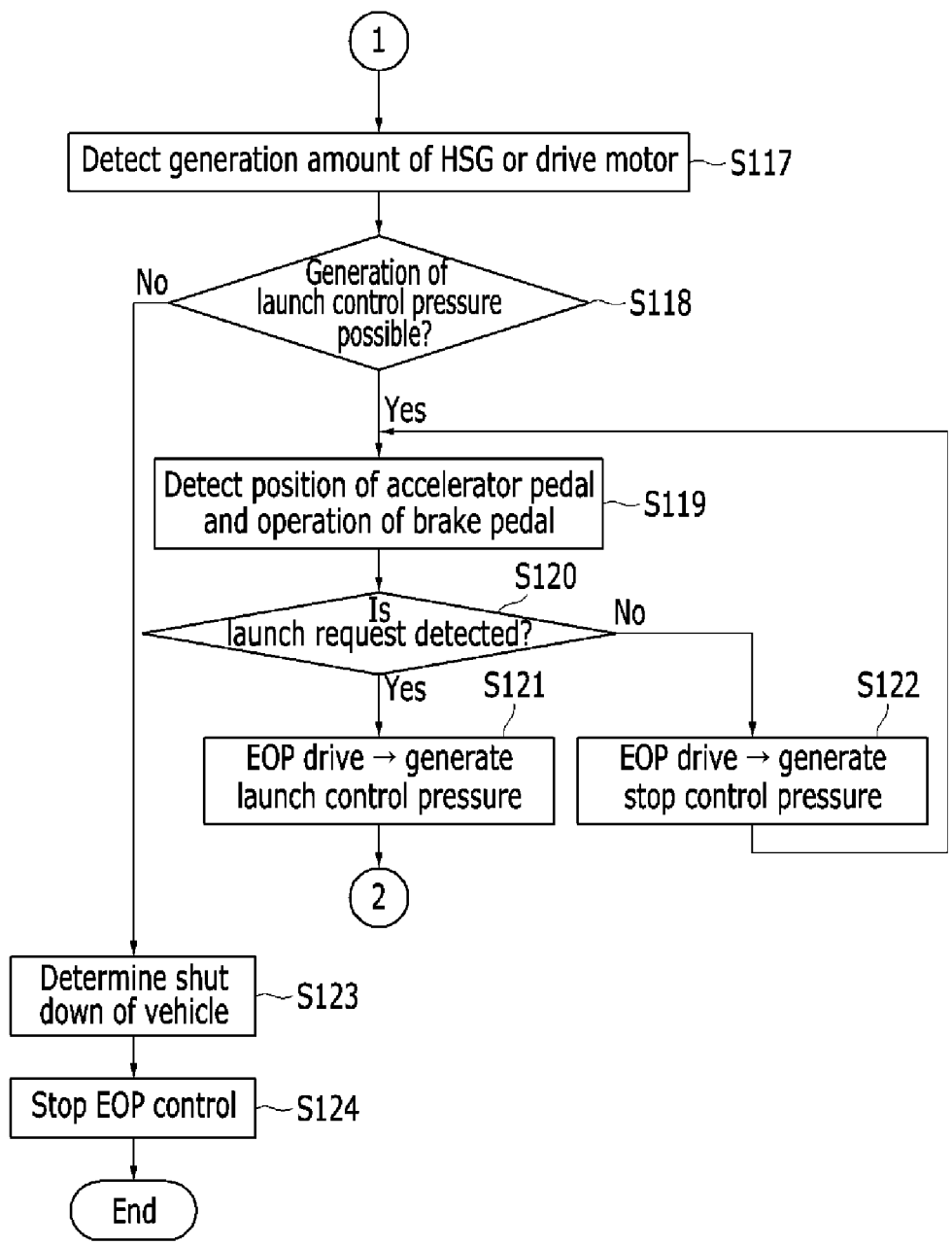

FIGS. 2A and 2B are a flowchart illustrating the steps of a method for controlling fail-safe of a hybrid vehicle according to an exemplary embodiment of the present invention.

If the hybrid vehicle according to an exemplary embodiment of the present invention is running, the hybrid controller 420 detects general operation information including a position of tip in/tip out of an accelerator pedal, on/off of, and pedal force on, a brake pedal, a running vehicle speed, a transmission stage, and a speed of drive motor 200 from the operation information detector 410 (S101).

The hybrid controller 420 controls general operation based on operation information from the operation information detector 410, and determines whether the high voltage component fails or not (S102).

When the failure of the high voltage component is not detected, the hybrid controller 420 performs normal control based on the operation information from the operation information detector 410 (S103).

However, when the failure of the high voltage component is detected, the hybrid controller 420 opens the main relay 460 to cutoff an output of the main battery 450, and proceeds to the fail-safe mode and reports the proceeding to the fail-safe mode to the oil pump controller 430 (S104).

Accordingly, when the proceeding of the hybrid controller 420 to the fail-safe mode due to the opening of the main relay 460 by the failure of the high voltage component is recognized, the oil pump controller 430 and the hybrid controller 420 cooperate to determine whether the hybrid vehicle is currently running or in a stop state (S106).

When the vehicle is running in the fail-safe mode in the step S106, the oil pump controller 430 detects a generation amount of the HSG 110 or the drive motor 200 (S107), and determines whether the generation of transmission control pressure is possible or not with the generation amount of the HSG 110 or the drive motor 200 (S108).

When the generation of the transmission control pressure is possible with the generation amount of the HSG 110 or the drive motor 200 in the step S108, vehicle speed and a position of the accelerator pedal are detected (S109), and the oil pump controller 430 determines whether an up/down transmission request is detected or not (S110).

If the up/down transmission request is detected in the step S110, the oil pump controller 430 controls the drive of the electric oil pump 400 to generate the transmission control pressure to supply the oil to the transmission 300, thereby making a target transmission stage to couple (S111).

The oil pump controller 430 controls a drive of the electric oil pump 400 at the generation of a transmission control pressure until gear shifting of the transmission 300 to the target transmission stage is finished in the step S111. If the gear shifting of the transmission 300 to the target transmission stage is finished (S112), the oil pump controller 430 controls the drive of the electric oil pump 400 at the generation of running control pressure (S113).

If the up/down transmission request is not detected in the step S110, the oil pump controller 430 controls the drive of the electric oil pump 400 at the generation of running control pressure to maintain the running in the fail-safe mode (S113).

Since all of the generation of running control pressure, the generation of launch control pressure, and the generation of stop control pressure are possible in a state the generation of transmission control pressure is possible with the generation amount of the HSG 110 or the drive motor 200, the oil pump controller 430 controls the electric oil pump 400 according to a drive situation to supply the pressure the transmission 300 requires.

Further, if the generation of the transmission control pressure is impossible with the generation amount of the HSG 110 or the drive motor 200 in the step S108, the oil pump controller 430 determines whether the generation of running control pressure is possible with the generation amount of the HSG 110 or the drive motor 200 or not (S114).

When the generation of the running control pressure is possible in the step S114, the oil pump controller 430 controls the oil pump 400 at the generation of the running control pressure to maintain running in a current fail-safe mode (S113).

If the generation of running control pressure is impossible with the generation amount of the HSG 110 or the drive motor 200 in step the S114, the oil pump controller 430 determines that the hybrid vehicle is in shut down and stops the drive of the electric oil pump 400 (S116).

Further, If it is determined that the hybrid vehicle is in stop in the fail-safe mode in step the S106, the oil pump controller 430 detects the generation amount of the HSG 110 or the drive motor 200 (S117), and determines whether the generation of launch control pressure is possible with the generation amount of the HSG 110 or the drive motor 200 or not (S118).

If the generation of the launch control pressure is possible with the generation amount of the HSG 110 or the drive motor 200 in the step S118, the oil pump controller 430 detects a position of the accelerator pedal and an operation of the brake pedal to detect a launch request (S119).

If the launch request is detected based on the position of the accelerator pedal and the operation of the brake pedal (S120), the oil pump controller 430 controls the drive of the electric oil pump 400 to generate the launch control pressure to supply the oil to the transmission 300 to control launch in the fail-safe mode (S121).

However, if the launch request is not detected in the step S120, the oil pump controller 430 drives the electric oil pump 400 to generate the stop control pressure to maintain a stop state in the fail-safe mode (S122).

Further, if the generation of the transmission control pressure is not possible with the generation amount of the HSG 110 or the drive motor 200 in the step S118, the oil pump controller 430 determines that the vehicle is in shut-down (S123) and stops the drive of the electric oil pump 400 (S124).

As has been described, according to an exemplary embodiment of the present invention, the electric oil pump is driven with the generation voltage of the HSG or the drive motor in the fail-safe running mode in which the main relay is cutoff in the hybrid vehicle, enabling to form pressure required for operation of the automatic transmission, thereby providing safety and reliability of running of the hybrid vehicle.

Further, according to the exemplary embodiment of the present invention, by limiting the drive of the electric oil pump to the preset 3 stages of driving conditions according to the generation amount of the HSG or the drive motor, the limited voltages generated by the HSG or the drive motor can be used, efficiently.

In addition, in the exemplary embodiment of the present invention, the secure embodiment of the fail-safe mode by an algorithm of software in a state no additional hardware is mounted to the electric oil pump and the oil pump controller permits to reduce cost and improve price competitiveness.

For convenience in explanation and accurate definition in the appended claims, the terms "upper", "lower", "inner" and "outer", are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A device for controlling fail-safe of a hybrid vehicle including an engine and a drive motor as driving sources, the device comprising:
   a hybrid starter and generator (HSG) engaged to the engine and operating as a motor to perform start on/off of the engine, and operating as a generator in a start on state of the engine;
   an electric oil pump to supply oil to a transmission and an engine clutch;
   an operation information detector to detect operating information on the hybrid vehicle;
   a hybrid controller to control operation of the vehicle based on the general operation information received from the operation information detector, and to control running of the hybrid vehicle in a fail-safe mode when a main relay is opened due to failure of a high voltage component; and
   an oil pump controller to drive the electric oil pump for supplying oil pressure proper to an operation condition to the transmission and the engine clutch, wherein the oil pump controller is electrically connected to the hybrid controller, wherein the oil pump controller controls a drive of the electric oil pump stage by stage with a generation amount of the HSG or the driver motor to generate the oil pressure when the oil pump controller recognizes that the hybrid controller proceeds to the fail-safe mode due to the failure of the high voltage component.

2. The device for controlling the fail-safe of the hybrid vehicle of claim 1, wherein the oil pump controller controls the electric oil pump to generate control pressure classified into generation of transmission control pressure, generation of launch control pressure, generation of running control pressure, and generation of stop control pressure according to the generation amount of the HSG or the drive motor.

3. The device for controlling the fail-safe of the hybrid vehicle of claim 1, wherein the oil pump controller classifies generation of control pressure stage by stage based on power consumption of the electric oil pump.

4. The device for controlling the fail-safe of the hybrid vehicle of claim 1, wherein, when generation of a transmission control pressure is possible with the generation amount of the HSG or the drive motor in the running of the fail-safe mode, the oil pump controller controls the drive of the electric oil pump according to an up/down transmission request for the electric oil pump to generate the transmission control pressure.

5. The device for controlling the fail-safe of the hybrid vehicle of claim 4, wherein, when coupling to a target transmission stage is completed in the generation of the transmission control pressure by driving the electric oil pump with the generation amount of the HSG or the drive motor in the running of the fail-safe mode, the oil pump controller controls the drive of the electric oil pump at generation of a running control pressure.

6. The device for controlling the fail-safe of the hybrid vehicle of claim 1, wherein, when generation of transmission control pressure is impossible, but the generation of transmission control pressure is possible in the running in the fail-safe mode with the generation amount of the HSG or the drive motor, the oil pump controller drives the electric oil pump with the generation amount for the electric oil pump to generate a running control pressure.

7. The device for controlling the fail-safe of the hybrid vehicle of claim 1, wherein, when the generation of running control pressure is impossible with the generation amount of the HSG or the drive motor in the running of the fail-safe mode, the oil pump controller determines that the vehicle is in shut-down, and stops the drive of the electric oil pump.

8. The device for controlling the fail-safe of the hybrid vehicle of claim 1, wherein when generation of a launch control pressure is possible with the generation amount of the HSG or the drive motor in stop in the fail-safe mode, and an launch request is detected, the oil pump controller drives the electric oil pump with the generation amount for the electric oil pump to generate the launch control pressure.

9. The device for controlling the fail-safe of the hybrid vehicle of claim 1, wherein, when generation of a launch control pressure is possible with the generation amount of the HSG or the drive motor in stop in the fail-safe mode, and the launch request is not detected, the oil pump controller drives the electric oil pump with the generation amount for the electric oil pump to generate a stop control pressure.

10. The device for controlling the fail-safe of the hybrid vehicle of claim 1, wherein, when the generation of launch control pressure is impossible with the generation amount of the HSG or the drive motor in stop in the fail-safe mode, and the launch request is detected, the oil pump controller determines that the vehicle is in shut down and stops the drive of the oil pump.

11. The device for controlling the fail-safe of the hybrid vehicle of claim 1, wherein, when the generation of transmission control pressure is possible with the generation amount of the HSG or the drive motor in running in the fail-safe mode, the oil pump controller drives the electric oil pump according to an operation condition for the electric oil pump to generate a transmission control pressure, a launch control pressure, a running control pressure, and a stop control pressure.

12. A method of controlling fail-safe of a hybrid vehicle, the method comprising:
    determining whether the hybrid vehicle proceeds to a fail-safe mode due to a main relay opened by failure of a high voltage component during running of the hybrid vehicle or not;
    detecting a generation voltage of a hybrid starter and generator (HSG) or a drive motor when the proceeding to the fail-safe mode is determined; and
    generating oil pressure by controlling drive of an electric oil pump according to a generation amount of the HSG or the drive motor in running in the fail-safe mode or in a stop state.

13. The method of claim 12, further comprising:
    controlling the drive of the electric oil pump to generate control pressure classified into generation of transmission control pressure, generation of launch control pressure, generation of running control pressure, and generation of stop control pressure stage by stage based on power consumption of the electric oil pump according to the generation amount of the HSG or the drive motor.

14. The method of claim 12, wherein further comprising:
    controlling the drive of the electric oil pump at a transmission control pressure according to an up/down transmission request determined by a vehicle speed, and a position of an acceleration pedal when generation of the transmission control pressure is possible with the generation amount of the HSG or the drive motor in the running in the fail-safe mode.

15. The method of claim 14, further comprising:
    controlling the drive of the electric oil pump at the generation of running control pressure when coupling of a target transmission stage is completed in a step of the generation of transmission control pressure with the generation amount of the HSG or the drive motor in the running in the fail-safe mode.

16. The method of claim 14, further comprising:
    controlling the drive of the electric oil pump at the generation of running control pressure when the up/down transmission request is not detected, which is determined by the vehicle speed and the position of the acceleration pedal, though the generation of the transmission control pressure is possible with the generation amount of the HSG or the drive motor in running in the fail-safe mode.

17. The method of claim 12, further comprising:
    controlling the drive of the electric oil pump at generation of running control pressure when the generation of transmission control pressure is impossible, but the generation of the running control pressure is possible with the generation amount of the HSG or the drive motor in the running in the fail-safe mode.

18. The method of claim 12, further comprising:
    controlling the drive of the electric oil pump at generation of launch control pressure when the generation of the launch control pressure is possible with the generation amount of the HSG or the drive motor in stop in the fail-safe mode, and an launch request is detected from tip in to an acceleration pedal and step off from a brake pedal.

19. The method of claim 12, further comprising:
controlling the drive of the electric oil pump at generation of stop control pressure when generation of launch control pressure is possible with the generation amount of the HSG or the drive motor, and the launch request is not detected in stop in the fail-safe mode.

20. The method of claim 12, further comprising:
stopping drive of the electric oil pump upon determining that the vehicle is in shut down when the generation of running control pressure is impossible with generation amount of the HSG or the drive motor in running in the fail-safe mode or generation of launch control pressure is impossible with the generation amount of the HSG or the drive motor in stop in the fail safe mode.

* * * * *